United States Patent
Romanovskiy et al.

(10) Patent No.: US 6,258,333 B1
(45) Date of Patent: Jul. 10, 2001

(54) METHOD FOR THE SIMULTANEOUS RECOVERY OF RADIONUCLIDES FROM LIQUID RADIOACTIVE WASTES USING A SOLVENT

(75) Inventors: Valeriy Nicholiavich Romanovskiy; Igor V. Smirnov; Vasiliy A. Babain, all of St. Petersburg (RU); Terry A. Todd, Aberdeen; Ken N. Brewer, Arco, both of ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/414,446

(22) Filed: Oct. 7, 1999

(30) Foreign Application Priority Data

Feb. 23, 1999 (RU) ................................. 99103419

(51) Int. Cl.[7] ........................ B01D 11/00; C01G 56/00; C22B 60/02; C01F 17/00
(52) U.S. Cl. ................................. 423/10; 423/2; 423/8; 423/21.5
(58) Field of Search ........................ 423/2, 8, 10, 21.5

(56) References Cited

U.S. PATENT DOCUMENTS

| | | |
|---|---|---|
| 3,243,254 * | 3/1966 | Siddall . |
| 4,396,556 * | 8/1983 | Kern . |
| 4,548,790 * | 10/1985 | Horwitz et al. . |
| 4,749,518 | 6/1988 | Davis, Jr. et al. .................. 252/627 |
| 5,510,091 * | 4/1996 | Rais et al. . |
| 5,603,074 | 2/1997 | Miller et al. .............................. 423/2 |
| 5,666,641 | 9/1997 | Abney et al. ............................. 423/2 |
| 5,666,642 | 9/1997 | Hawthorne et al. ..................... 423/2 |
| 5,698,169 | 12/1997 | Hawthorne et al. ..................... 423/2 |

FOREIGN PATENT DOCUMENTS

| | | |
|---|---|---|
| 1589858 * | 7/1994 | (SU) . |
| 1603552 * | 7/1994 | (SU) . |

* cited by examiner

Primary Examiner—Steven P. Griffin
Assistant Examiner—Christina Ildebrando
(74) Attorney, Agent, or Firm—Virginia B. Caress; Paul A. Gottlieb

(57) ABSTRACT

The present invention relates to solvents, and methods, for selectively extracting and recovering radionuclides, especially cesium and strontium, rare earths and actinides from liquid radioactive wastes. More specifically, the invention relates to extracting agent solvent compositions comprising complex organoboron compounds, substituted polyethylene glycols, and neutral organophosphorus compounds in a diluent. The preferred solvent comprises a chlorinated cobalt dicarbollide, diphenyl-dibutylmethylenecarbamoylphosphine oxide, PEG-400, and a diluent of phenylpolyfluoroalkyl sulfone. The invention also provides a method of using the invention extracting agents to recover cesium, strontium, rare earths and actinides from liquid radioactive waste.

14 Claims, 1 Drawing Sheet

METHOD FOR THE SIMULTANEOUS RECOVERY OF RADIONUCLIDES FROM LIQUID RADIOACTIVE WASTES USING A SOLVENT

ACKNOWLEDGMENTS

This invention was made with government support under Contract No. DE-AC-07-94ID13223 awarded by Department of Energy to the Lockheed Idaho Technologies Company. The government has certain rights in the invention.

BACKGROUND OF THE INVENTION

The present invention relates to extracting agents and methods for selectively recovering certain radionuclides, rare earths and actinides from radioactive wastes. More specifically, the invention relates to extracting agent compositions comprising complex organoboron compounds, substituted polyethylene glycol and, a neutral organophosphorus compound in a diluent. The invention also provides a method of using extracting agents to recover actinides and certain radionuclides from radioactive waste.

Liquid wastes from nuclear fuel reprocessing are extremely hazardous and expensive to dispose of. Cesium-137, strontium-90, transuranium elements and technetium, which are present in these wastes are of particular concern. The transuranium elements are typically alpha-emitters with very long half-lives, and cesium and strontium are the major heat generators of the waste and produce gamma and beta radiation. Technetium, as the pertechnetate ion, is very mobile in the environment and has an extremely long half life. To increase safe handling of the majority of the waste, and to significantly reduce the storage and/or disposal cost of the waste, it is desirable to partition the waste into two fractions, one containing the majority of the highly radioactive components, and one containing the bulk of the non-radioactive portion of the waste.

Nuclear waste exists in numerous forms and locations world-wide. The largest inventory of highly radioactive materials is produced from the reprocessing of spent nuclear fuel. The fission process produces a number of undesirable, highly-radioactive elements which accumulate in the nuclear fuel. For the reuse or recycling of the unused fissionable material left in the fuel, normally either uranium-235 or plutonium-239, a separation process is employed to partition the fissionable material from the undesirable fission products. This is normally accomplished by leaching or dissolution of a portion or all of the spent nuclear fuel material, followed by chemical separation. Early chemical separation processes were based on precipitation, where, for example, $BiPO_4$ was used to coprecipitate plutonium for weapons-grade plutonium production. More recently, and by far the most common, solvent extraction processes utilizing tri-n-butyl phosphate are used to chemically separate uranium and/or plutonium from solutions resulting from dissolution or leaching of spent nuclear fuel. The remaining acidic liquid waste, containing the highly radioactive fission products and trace transuranic elements, has been accumulated and stored in various forms around the world for the past 45 years.

Facilities in the United Kingdom, France, Japan, Russia, and China currently use the PUREX process (plutonium-uranium extraction) to recover and purify uranium and/or plutonium. The United States utilized this process (or variations of this process) for commercial-fuel reprocessing at the West Valley Plant, in upstate New York in the 1970's, and for reprocessing of weapons-grade plutonium at the Hanford Site in eastern Washington State, aluminum driver fuel at Savannah River Site in South Carolina, and naval fuel at the Idaho Chemical Processing Plant at the Idaho National Engineering and Environmental Laboratory (INEEL) in eastern Idaho. The reprocessing activities at Hanford were discontinued in the late 1980's and operations at Savannah River and the INEEL were discontinued in the early 1990's. There is currently no active nuclear fuel reprocessing facility in the United States. There is however, a significant legacy of nuclear waste in storage from previous reprocessing activities. The majority of this waste was neutralized with caustic to facilitate storage in carbon steel vessels (Hanford and Savannah River). At the Idaho Chemical Processing Plant, this waste was calcined in a fluidized-bed calciner at 500° C., producing a granular solid. This solid calcine is stored in stainless steel bins inside concrete vaults. Currently about 4100 $m^3$ of highly radioactive calcine is stored at the INEEL, and about 1.2 million gallons of acidic liquid waste.

Currently, separate technologies are required for removing actinides and fission products from the wastes, and often times, separate processes may be required for specific radionuclides such as cesium, strontium and technetium.

The invention describes novel extraction processes that will readily meet current safety standards and that will effectively separate the above-mentioned radioactive elements from typical nuclear reprocessing wastes. The liquid waste can be effectively decontaminated to meet low level waste standards in one simultaneous solvent extraction process. This process offers the advantage of completing the decontamination of the waste in a single process using a novel solvent, which will significantly reduce capital and operating costs.

U. S. Pat. No. 4,749, 518 (Davis) teaches a method for reprocessing nuclear waste by extracting cesium and strontium with crown compounds and cation exchangers.

U. S. Pat. No. 5,603,074 (Miller et al.) teaches a method of recovering cesium and strontium from an aqueous solution using a cobalt dicarbollide derivative.

U. S. Pat. No. 5,666,641 (Abney et al.) discloses a method of recovering cesium and strontium from an aqueous solution with polymeric materials and derivatives of cobalt dicarbollide.

U. S. Pat. Nos. 5,666,642 and 5,698,169 (Hawthorne et al.) teach the extraction of cesium and strontium from aqueous solutions, including fission product waste, using substituted metal dicarbollide ions.

To date, known technologies have required separate techniques for separating actinides and fission products. However, Applicants have surprisingly discovered a novel extracting agent solvent system for the selective and simultaneous recovery of radionuclides and actinides. Prior art methods were all very cost intensive and involved two or three separate processes. The process of the invention is cost effective and separates the actinides and fission products in one process.

SUMMARY OF THE INVENTION

The present invention provides for an extracting agent composition and a method for the selective sequential recovery of radionuclides, rare earths, and actinides using a novel solvent system.

One embodiment of the invention relates to an extracting agent composition for extracting specific radionuclides, rare earths, and actinides from a liquid radioactive waste comprising a complex organoboron compound, an unsubstituted or substituted polethylene glycol, and a neutral organophosphorus compound.

Another embodiment of the invention relates to an extracting agent composition for extracting specific radionuclides, rare earths, and actinides from a liquid radioactive waste comprising a chlorinated cobalt dicarbollide, polyethylene glycol-400, diphenyl-dibutylcarbamoylmethylenephosphine oxide in a diluent such as phenyltrifluoromethyl sulfone.

Another embodiment of the invention relates to a method for simultaneously recovering radionuclides, specifically cesium and strontium, rare earths, and actinides from liquid radioactive waste comprising contacting the liquid radioactive waste with a solution of a complex organoboron compound, an unsubstituted or substituted polyethylene glycol, a neutral organophosphorus compound and a diluent.

Another embodiment of the invention relates to a method for simultaneously recovering radionuclides, specifically cesium and strontium, rare earths, and actinides from liquid radioactive waste comprising contacting the liquid radioactive waste with a solution of a chlorinated cobalt dicarbollide, polyethylene glycol-400, diphenyl-dibutylcarbamoylmethylene phosphine oxide, in a diluent such as phenyltrifluoromethyl sulfone.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
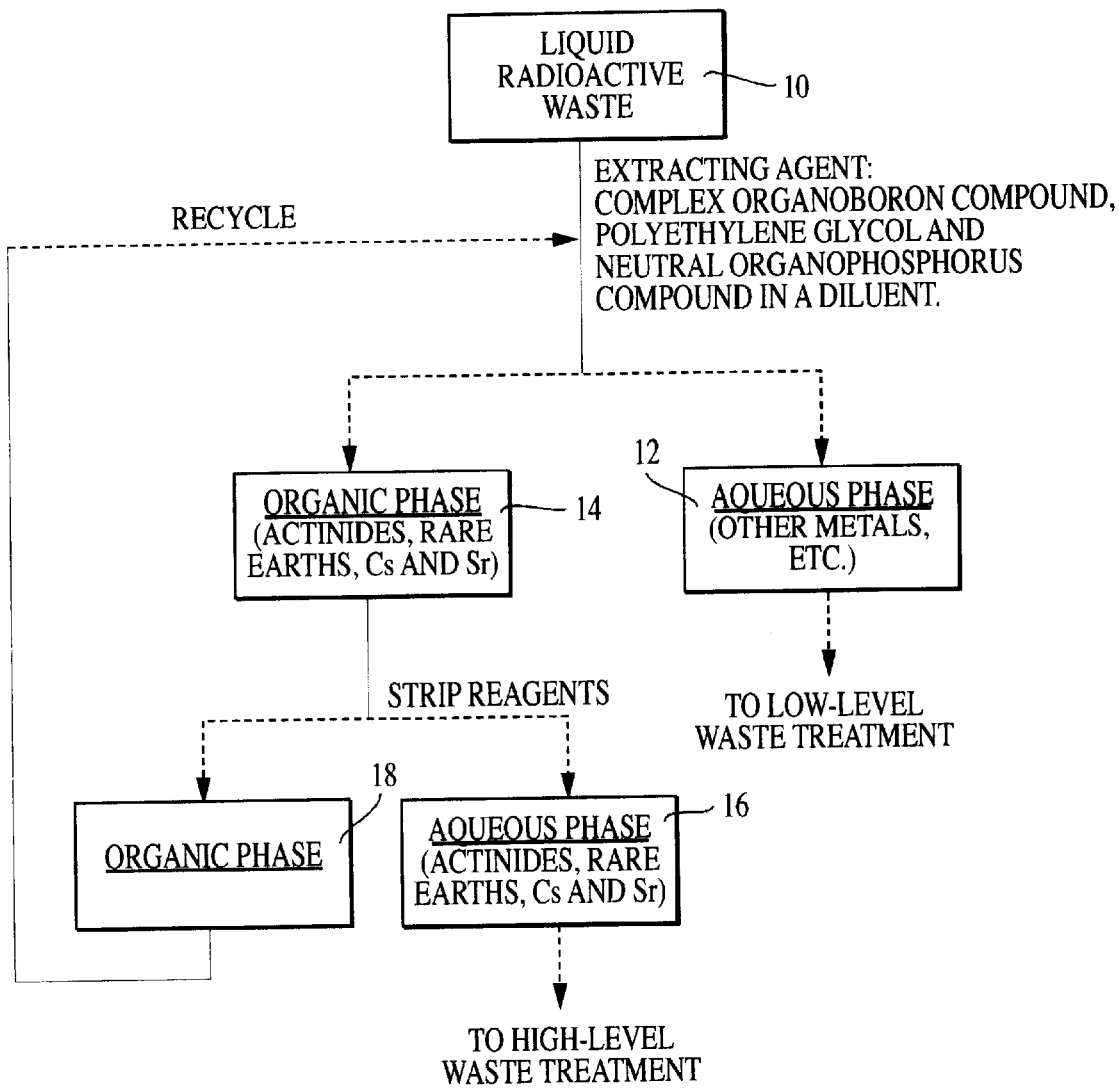
FIG. 1 is a simplified flow diagram showing the application of the universal solvent for treatment of aqueous radioactive waste. Usually, in actual practice, the treatment of waste using the universal solvent occurs in a countercurrent solvent extraction process, which is known to those skilled in the art.

The present invention may be understood more readily by reference to the following detailed description of preferred embodiments of the invention, the examples included therein and to the FIG. 1, and their previous and following description.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a pharmaceutical carrier" includes mixtures of two or more such carriers, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

In this specification and in the claims which follow, reference will be made to a number of terms which shall be defined to have the following meanings:

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term aryl refers to aromatic rings, e.g., phenyl, substituted phenyl and the like, as well as rings which are fused, e.g., naphthyl, phenanthrenyl and the like. An aryl group thus contains at least one ring having at least 6 atoms, with up to five such rings being present, containing up to 22 atoms therein, with alternating (resonating) double bonds between adjacent carbon atoms or suitable heteroatoms, The preferred aryl groups are phenyl, naphthyl, and phenanthrenyl.

The term aralkyl or arylalkyl refers to a compound having both aliphatic and aromatic moieties.

The term "alkoxy" or "alkoxyl" as used herein intends an alkyl group bound through a single, terminal ether linkage; that is, an "alkoxy" group may be defined as —OR where R is alkyl as defined above. A "lower alkoxy" group intends an alkoxy group containing from one to six, more preferably from one to four, carbon atoms.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

The terms actinides as used herein, refers to the group of radioactive elements which includes uranium, neptunium, plutonium, americium, and curium.

The term radionuclides generally refers to any radioactive isotope, but as used herein refers more specifically to the radioactive isotopes of cesium and strontium, especially $^{137}Cs$ and $^{90}Sr$.

The term rare earths refers to the group of elements which includes lanthanum, cerium, praseodymium, neodymium, promethium, samarium, europium, gadolinium, terbium, dysprosium, holmium erbium, thulium, ytterbium, and lutetium.

The term transuranium refers to a radioactive element having a higher atomic number than uranium, not found naturally, and produced by nuclear bombardment.

The term halogen and halogenated refer to bromine, chlorine, fluorine and iodine.

One embodiment of the invention relates to an extracting agent composition for extracting cesium, strontium, rare earths and actinides from a liquid radioactive waste comprising a complex organoboron compound, an unsubstituted or substituted polyethylene glycol, and a neutral organophosphorus compound.

Within this embodiment, a particular complex organoboron compound is cobalt dicarbollide of the formula $(CoC_2B_9H_{11})_2$. More preferred is a halogenated cobalt dicarbollide. Even more preferred is a chlorinated cobalt dicarbollide.

The polyethylene glycol (PEG) in this embodiment has the formula:

$$RO(CH_2CH_2O)_nH;$$

wherein n is 5–14 and;

R is H, alkyl (C=1–20), or phenyl substituted with alkyl groups of C=1–8. A preferred polyethylene glycol is one where R=H (e.g. PEG-400, PEG-600).

The neutral organophosphorus compound can be a carbamoylmethylenephosphine oxide (CMPO), a diphosphine oxide, or a carbamoylphosphonate. These compounds have the general formula

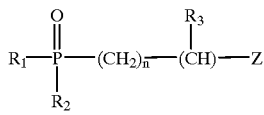

wherein n=0 or 1, $R_1$ and $R_2$ are alkyl (C=4–10), alkoxy (C=4–8), or phenyl or substituted phenyl where the substituents are alkyl (C=1–10), $R_3$ is H or alkyl (C=1–5), Z is 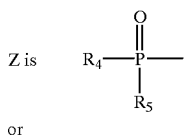

or

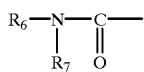

wherein $R_4$ and $R_5$ are alkyl (C=4–10), alkoxy (C=4–8), or phenyl or substituted phenyl where the substituents are alkyl groups (C=1–10), $R_6$ and $R_7$ are alkyl, where the number of C atoms=2–8, or $R_6$ and $R_7$ form a morpholine, piperidine or pyrrolydine ring with the nitrogen:

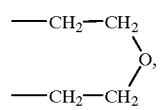 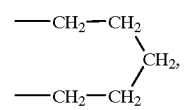

-continued

A preferred neutral organophosphorus compound is diphenyl-dibutylcarbamoylmethylenephosphine oxide, where n=0, $R_1$ and $R_2$ are unsubstituted phenyl groups, $R_3$ is H, and Z is the

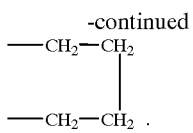

group ("carbamoyl" group), where $R_6$ and $R_7$ are n-butyl groups.

This embodiment further comprises a diluent of one, or a mixture of two or more, of alkylbenzene, dialkylbenzene, trialkylbenzene, alkylnitrobenzene and polyfluoroalkyl nitrobenzenes. Other diluents included within this embodiment are polyfluorinated esters or polyfluorinated ethers. The ethers have the formula $R_FOR_{11}$, where $R_F$ is a polyfluoroalkyl with the number of C atoms from 1 to 5, and F atoms from 2 to 9; $R_{11}$ is aryl (phenyl group, or substituted phenyl group where substituents are one or more alkyl groups with C atoms from 1 to 4), or $R_{11}$ is alkyl with the number of C atoms from 2 to 5, or polyethers with the formula $R_FO(CH_2)_nOR_{11}$ where n=1 or 2 or polyethers with the formula $R_FO(CH_2CH_2O)_nR_{11}$ where n=1 or 2, and esters with the formula $R_FOOCR_{11}$. Also other diluents are polyfluoro-substituted sulfones with the formula:

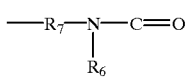

wherein;

$R_1$ is a polyfluoroalkyl group with the number of C atoms from 1 to 3, and 2–7 fluorine atoms, preferably from 3 to 4 fluorine atoms, and $R_2$ is an alkyl atom, with the number of C atoms from 4 to 12, or aryl or substituted aryl, or arylalkyl, or alkoxyalkyl with the number of C atoms from 6 to 10, or polyfluoroalkoxyalkyl with the number of C atoms from 6 to 10, and 2–7 fluorine atoms. A preferred diluent is phenyltrifluoromethyl sulfone.

In a preferred embodiment of the invention, the extracting agent composition for extracting cesium, strontium, rare earths and actinides from a liquid radioactive waste comprises a chlorinated cobalt dicarbollide, polyethylene glycol-400, and diphenyl-dibutylcarbamoylmethylenephosphine oxide in a diluent of phenyltrifluoromethyl sulfone.

Another embodiment of the invention relates to a method for simultaneously recovering radionuclides, rare earths, and actinides from liquid radioactive waste comprising contacting the liquid radioactive waste with the extracting agent composition of a solution of a complex organoboron compound, an unsubstituted or substituted polyethylene glycol, a neutral organophosphorus compound and a diluent, as described above.

Another embodiment of the invention relates to a method for simultaneously recovering radionuclides, especially cesium and strontium, rare earths, and actinides from liquid radioactive waste comprising contacting the liquid radioactive waste with a solution of a chlorinated cobalt dicarbollide, polyethylene glycol-400, diphenyl-dibutyl carbamoylmethylenephosphine oxide in a diluent of phenyltrifluoromethyl sulfone.

With reference to FIG. 1, the method comprises contacting the liquid radioactive waste 10 with the extracting agent composition of the invention comprising a complex organoboron compound, polyethylene glycol, and a neutral organophosphorus compound in a diluent. The mixture is separated into an organic phase 14 containing the actinides, rare earths, and the radionuclides Cs and Sr, and an aqueous phase 12, containing any other metals that may be present in the waste. The aqueous phase is sent to liquid low-level waste treatment. A strip reagent, for example 1M guanidine carbonate with 10 g/L diethyltriamine penta-acetic acid (DTPA), is mixed with the organic phase 14, which is then separated into a further aqueous phase 16 containing the Cs, Sr, actinides and rare earths, and an organic phase 18 containing the solvent. The aqueous phase 16 can be treated to recover the radionuclides or subjected to vitrification or other methods of high-level waste disposal. The organic phase 18 can be recycled back to the aqueous radioactive waste 10. The FIG. 1 is a simplified flow diagram. In actual practice the separations are done in a countercurrent solvent extraction process, well known to those skilled in the art.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature, and pressure is at or near atmospheric.

The cobalt dicarbollide (CDC) can be purchased as the cesium salt, from Katchem, Ltd., E1 Krasnohorske 6, 1100 00 Prague 1, Czech Republic. To produce chlorinated cobalt dicarbollide (CCD), the cesium salt of CCD is dissolved in diluent (e.g. phenyltrifluoromethyl sulfone), typically 1 gram CCD per 10 mL of diluent. The CCD/diluent mixture is then contacted with an equal volume of 8–10 M $HNO_3$ for 3–5 minutes. The two phases are then separated and the CCD/diluent mixture is again contacted with fresh 8–10 M $HNO_3$. This procedure is repeated 3–4 times, then the solvent mixture is contacted with excess (typically 5 times organic vol.) 0.1 M $HNO_3$, to produce the CCD.

The CMPO was synthesized in accordance with the method in Kem K. J. Org. Chem. 1981, v.46, N25, pp. 5188–5192.

The various polyethylene glycols may be purchased from several companies including Union Carbide Corp., 39 Old Ridgebury Road, Danbury, Conn. 06817-001.

The preferred diluents, phenyltrifluoromethyl sulfone ($C_6H_5SO_2CF_3$) and phenyltetrafluoroethyl sulfone can be prepared by oxidation of the corresponding sulfides. Usually sulfides are oxidized to sulfones by using chromic anhydride ($CrO_3$) in sulfuric acid or acetic acid [Yagupol'ski, L. M., Yagupol'skaya, L. N., Dokl. Akad. Nauk. SSSR (Proc. USSR Acad. Sci.), v.134, p. 1381(1960); Yagupol'ski, L. M., Gruzd B. E. Jurnal Obschei Himii (Russian Journal of General Chem.), v. 31, p. 2470 (1961)]. An alternative method of oxidizing sulfides to sulfones is to use hydrogen peroxide during the oxidation process. This method of oxidizing sulfides is taught by Weygand-Hilgetag "Organisch-Chemische Experimentierkunst," 3 Auflage, 611–613 (1969), Johann Ambrosius Barth Publishers, Leipzig, Germany.

Phenyltrifluoromethyl sulfone was prepared from thioanisole (methyl phenyl sulfide, $C_6H_5SCH_3$) through phenyltrichloromethyl sulfide and phenyltrifluoromethyl sulfide by known methods [Yagupol'ski, L. M., Klushnik, G. L., Troitskaya, V. I., Jurnal Obschei Himii (Russian Journal of General Chem.), v. 34, p. 307 (1964); Yagupol'ski, L. M., et al., Jurnal Obschei Himii (Russian Journal of General Chem.), v. 37, p. 191 (1967); Nodiff, E. A., Lipschutz, S., Craig, P. N., Gordon, M., J. Org. Chem., v. 25, p. 60 (1960)].

Phenyltetrafluoroethyl sulfide was prepared from thiophenol by known methods [Sheppard, W. A., J. Am. Ch. Soc., v.85, p. 1314 (1963); England, D. C., et al., J. Am. Ch. Soc., v. 82, p. 5116 (1960)]. The sulfone was prepared by oxidizing the sulfide, as described above.

The PEG/diluent solution and CMPO/diluent solutions are added to the CDC/diluent mixture, in appropriate ratios to obtain the desired ratio of CDC/PEG/CMPO. Final concentrations of the CDC, PEG, and CMPO in the universal solvent mixture can be adjusted by addition of fresh diluent.

Evaluation of Carbamoyl Compounds

The phosphonate compound, dioctyl-N,N-dibutylmethylenecarbamoylphosphonate (($OctO)_2Bu_2CMP$) was evaluated at different concentrations in 0.06 M of chlorinated cobalt dicarbollide (CCD) and 1% Slovafol, a substituted polyethylene glycol (PEG) in a nitrobenzene derivative as the diluent. This mixture was contacted with 3 M $HNO_3$ aqueous solution containing 0.001 M cesium, strontium, barium, and europium (Cs, Sr, Ba, and Eu) and trace amounts of americium, plutonium, and neptunium (Am, Pu(IV) and Np(V)). Results from these tests are shown in Table 1. In all the following tables, the distribution coefficient D is the ratio of the concentration of the subject element in the organic phase to the concentration in the aqueous phase; D=conc. in org. phase/conc. in aq. phase.

Table 1. Metal extraction distribution coefficients from 3 M $HNO_3$ using 0.06 M CCD, 1% Slovafol and $(OctO)_2Bu_2CMP$ in a nitrobenzene derivative.

TABLE 1

| (OctO)$_2$Bu$_2$ CMP | Cs | Sr | Eu | Pu | Np | Ba | Am |
|---|---|---|---|---|---|---|---|
| 0 | 9.2 | — | 0.002 | — | — | 110 | 0.01 |
| 0.02 | 2.8 | 9.2 | 0.4 | 60 | 13 | 58 | 0.69 |
| 0.03 | 0.98 | 5.7 | 1.8 | — | — | 42 | 3.9 |
| 0.04 | 0.35 | 2.5 | 4.1 | 200 | 33 | 15 | 14.3 |
| 0.06 | 0.17 | 0.8 | 7.1 | — | — | 3.9 | 20 |
| 0.1 | 0.1 | 0.2 | 8.2 | 90 | 10 | 1.3 | 25 |

Distribution Coefficients

Two phenyl substituted phosphine oxide compounds were evaluated for comparison with the phosphonate, (OctO)$_2$Bu$_2$CMP. These were a diphenyl substituted phosphine oxide($Ph_2Bu_2CMPO$) and an octylphenyl substituted phosphine oxide ($PhOctBu_2CMPO$). A solvent containing 0.06 M CCD, 1% Slovafol, and 0.02 M $Oct_2O_2Bu_2CMP$, or one of the phosphine oxide derivatives was contacted with 3 M $HNO_3$ containing 0.001 M Cs, Sr and Eu, with trace concentrations of Pu(IV) and Np (V). Results from these tests are shown in Table 2.

Table 2. Metal extraction distribution coefficients from 3 M $HNO_3$ using 0.06 M CCD, 1% Slovafol, and 0.02 phosphonate or phosphine oxide in a nitrobenzene derivative.

TABLE 2

| Phosphine Oxide or Phosphonate | Distribution Coefficients | | | | |
|---|---|---|---|---|---|
| | Cs | Sr | Eu | Pu | Np |
| $Ph_2Bu_2CMPO$ | 4 | 12 | 300 | 700 | >500 |
| $PhOctBu_2CMPO$ | 5 | 15 | 4 | 200 | 80 |
| $(OctO)_2Bu_2CMP$ | 3 | 9 | 0.4 | 60 | 10 |

The following conclusions were made regarding the data shown in Tables 1 and 2:

1) The carbamoylphosphonate, $(OctO)_2Bu_2CMP$, extracts all the long-lived radionuclides from 3M $HNO_3$, but is less efficient than the phosphine oxide compounds.

2) $Ph_2Bu_2CMPO$ is an efficient extractant as shown in Table 2, but for this phosphine oxide derivative a very polar diluent is required to form soluble metal complexes. One criterion for a process applicable for treating radioactive waste is the use of an environmentally compatible diluent. Some of these very polar diluents, such as nitrobenzene or nitrobenzene derivatives, may not be applicable for general use because they exhibit properties (volatility, flammability, and toxicity) that present environmental and/or safety concerns. (As described below, we have found that sulfones are good polar diluents to use instead of those listed above.)

3) Replacing one of the phenyl groups with an octyl group ($PhOctBu_2CMPO$) caused a decrease in the extraction of rare earths and actinides, but a less polar solvent can be used. However, to achieve acceptable levels of actinide and rare earth element extraction, a higher concentration of the octyl-phenyl compound is required as compared to the diphenyl compound.

Evaluation of Polyethylene Glycols

PEG is known to have a synergistic effect with CCD that causes an increase in Sr extraction. However, increasing the PEG concentration is also known to decrease Cs extraction. Therefore, minimal amounts of PEG should be used. The PEG structure may also influence the extraction properties of the tertiary solvent; therefore, the influence of PEG structure on the solvent was also investigated. PEG's have the general structure of $HO(C_2H_4O)_nH$, and the typical nomenclature of PEG #, where the # is equivalent to the molecular weight of the particular PEG.

Data illustrating the effects of the PEG structure, such as chain length and substituents, on the extraction of Cs, Sr, and Eu are shown in Table 3. The effects of PEG-600 concentration on the extraction of Cs and Sr are shown in Table 4. A sodium-bearing waste (SBW) simulant was used for these contacts (0.1 mM Cs, 0.41 mM Sr, and 0.11 mM Eu). PEG-400 has the structure of $HO(C_2H_4O)_8H$, and that of PEG-600 is $HO(C_2H_4O)_{12}H$. OP-10 is a di-isobutyl PEG compound having the formula of i-$(Bu)_2$-$C_6H_4O$$(C_2H_4O)_{10}H$.

Table 3. Extraction of Cs, Sr, and Eu from simulated SBW using 0.15 M CCD, 0.025 M $Ph_2Bu_2CMPO$, and 1% substituted PEG (OP-10 and SLOVAFOL-909) and unsubstituted PEG (PEG-300/400/1500) in a nitrobenzene derivative.

TABLE 3

| PEG | Distribution Coefficients | | |
|---|---|---|---|
| | Cs | Sr | Eu |
| SLOVAFOL-909 | 8.9 | 0.46 | 37 |
| OP-10 | 9.1 | 0.3 | 7.2 |
| PEG-1500 | 6.3 | 0.6 | 41 |
| PEG-400* | 4.5 | 4.1 | 43 |
| PEG-300 | 6.7 | 4 | 60 |

*used for actual waste test at the Idaho National Engineering and Environmental Laboratory (INEEL).

Table 4. Extraction of Cs and Sr from simulated SBW using 0.08 M CCD, 0.013 M $Ph_2Bu_2CMPO$ and various concentrations of PEG-600 in a nitrobenzene derivative.

TABLE 4

| Percent PEG-600 | Distribution coefficients | |
|---|---|---|
| | Cs | Sr |
| 0.6 | 3.7 | 0.6 |
| 0.7 | 2.8 | 0.8 |
| 0.8 | 2.5 | 1 |
| 1 | 1.9 | 1.2 |
| 1.5 | 0.4 | 1 |

The following conclusions were made regarding the data shown in Tables 3 and 4:

1) The tertiary solvent (CCD, PEG and the neutral organophosphorus compound) extracts strontium (and perhaps Eu) better when short oxyethyl chained (8–10 carbon atoms) non-substituted PEG's are used.

2) The choice of non-substituted PEG has a minimal influence on Cs and Eu extraction.

3) The most favorable PEG-600 concentration is 1%.

Similar tests were conducted using PEG-400, and it was determined that the best concentration was 0.6%. PEG-400 was ultimately chosen for use in the universal solvent.

Evaluation of Diluents

PEG-400 was used in the search for a suitable diluent for the tertiary solvent. The extractants 0.08 M CCD, 0.013 M $Ph_2Bu_2CMPO$, and 0.6% PEG-400 were used with several diluents in contacts with simulated SBW. The extraction distribution coefficients of Cs, Sr, and Eu were measured. A diluent containing 40% hexyldifluoromethylsulfone ($C_6H_{13}SO_2CF_2H$) and 60% toluene was found to give suitable extraction and metal solubility properties. Therefore, the use of fluorosubstituted sulfones as diluents, either alone or mixed with an aromatic compound, was investigated.

Sulfones are highly polar, but tend to be unreactive. They are chemically inert and have relatively high flash points (>100° C.), which indicates their physical properties are favorable for use in treating liquid radioactive wastes.

The physical properties and the extraction distribution coefficients of Cs were measured for several fluorosubstituted sulfones. A solvent containing 0.06 m CCD in 50% sulfone and 50% benzene was contacted with 3 M $HNO_3$ containing Cs. Results from these tests are shown in Table 5.

Two sulfone types were determined suitable for use based on the data shown in Table 5. The aromatic sulfones 1, 8 and 9 have good physical and extraction properties, while the aliphatic sulfones 2, 10, and 11 also have favorable properties. The aromatic sulfones have a low enough viscosity and enough density to be used by themselves, but the aliphatic sulfones need to be mixed with an additional diluent because their density is near that of SBW (~1.2 g/cm³).

Table 5. Important physical properties of fluorosubstituted sulfones and the distribution coefficient of Cs using 0.06 M CCD in 50% sulfone and 50% benzene.

TABLE 5

| Numerical designation | Formula | Density g/cm3 | Viscosity sPs | $D_{Cs}$*** |
|---|---|---|---|---|
| 1 | $CF_3SO_2C_6H_5$ | 1.41 | 3.6 | 5.6 |
|   |   |   |   | 3.8** |
| 2 | $CF_3SO_2C_5H_{11}$ | 1.23 | 2 | 6.6 |
|   |   |   |   | 2.9** |
| 3 | $CF_3SO_2C_{12}H_{25}$ | 1.04 | solid | 4.5 |
| 4 | $HCF_2CF_2CH_2SO_2C_5H_{11}$ | 1.16 | n.d. | 1.1 |
| 5 | $HCF_2CF_2CH_2SO_2C_4H_9$ | 1.32 | n.d. | 1.1 |
| 6 | $C_3H_7SO_2CH_2COOCH_2CF_2CF_2H$ | 1.71 | 35 | 9.4 |
| 7 | $HCF_2CF_2CH_2SO_2CH_2CH_2OCOCF_3$ | 1.46 | n.d. | 0.8** |
| 8 | $HCF_2SO_2C_6H_5$ | 1.39 | 15.2 | 3.5 |
|   |   |   |   | 2.6** |
| 9 | $HCF_2CF_2SO_2C_6H_5$ | 1.47 | 9 | 4.9** |
| 10 | $HCF_2SO_2C_6H_{13}$ | 1.12 | n.d. | 3.1 |
|   |   |   |   | 1.6** |
| 11 | $HCF_2CF_2SO_2C_8H_{17}$ | 1.19 | 9.5 | 9.2 |
|   |   |   |   | 6.5** |
| 12 | $HCF_2SO_2C_8H_{17}$ | 1.13 | 7.74 | 1.1* |

***$D_{Cs}$ = Distribution coefficient for cesium
**Distribution coefficient obtained for pure sulfone
n.d. means not detected
ᵃThese sulfones were used in actual waste test at the INEEL
*$D_{Cs}$ obtained from 0.08 M CCD, 0.02 M $Ph_2Bu_2CMPO$, 0.5% PEG-400 in 40% sulfone and 60% xylene.

Phenylpolyfluoroalkyl sulfones, especially #1 and #9 in Table 5, had the best combination of physical and extraction properties with CCD. These sulfones have a high density, low viscosity, and readily dissolve CCD. They are highly hydrophobic; therefore, minimal loses in the aqueous phase would be expected. The aromatic sulfones, phenyldifluoromethyl sulfone #8 and phenyltetrafluoroethyl sulfone #9, in addition to the aliphatic sulfones, hexyldifluoromethyl sulfone #10, octyltetrafluoroethyl sulfone #11, octyldifluoromethyl sulfone #12 and heptadifluoromethyl sulfone ($C_7H_{15}SO_2CF_2H$, not shown in Table 5), were synthesized for this study using the method as described above for phenyltrifluoromethyl sulfone.

The high viscosities of sulfones #8 and #6 limits their use as a diluent, while octyltetrafluoroethyl sulfone #11 showed poor solubility with the extracted metals. The other sulfones showed promise for use in the tertiary mixture.

Example 1

A solvent containing 0.08 M of chlorinated cobalt dicarbollide, 0.02 M diphenyldibutylcarbamoylmethylenephosphine oxide, and 0.6% PEG-400, in phenyltetrafluoroethyl sulfone was contacted with an actual tank waste solution at the INEEL, in a countercurrent process using 24 stages of centrifugal contactors. The test resulted in removal efficiencies of 99.95% for Cs-137, 99.985% for Sr-90 and 95.2% for alpha emitting actinides from the waste.

Example 2

A similar solvent containing 0.08 M of chlorinated cobalt dicarbollide, 0.02 M diphenyldibutylcarbamoylmethylenephosphine oxide, and 0.6% PEG-400, in phenyltrifluoromethyl sulfone was also contacted with an actual tank waste solution at the INEEL, in a countercurrent process using 24 stages of centrifugal contactors. This test resulted in removal efficiencies of 99.5% for Cs-137, 99.995% for Sr-90 and 99.6% for alpha emitting actinides from the waste.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for simultaneously recovering cesium, strontium, rare earths and actinides from liquid radioactive waste comprising:
   a) contacting the liquid radioactive waste with a solution of a complex organoboron compound, a substituted or unsubstituted polyethylene glycol, a neutral organophosphorus compound and a diluent,
   b) separating out an organic phase and an aqueous phase,
   c) mixing stripping reagents with the organic phase formed in step (b), so that an aqueous phase and an organic phase are formed, wherein the cesium, strontium, actinides and rare earths are extracted into the aqueous phase, and
   d) recovering or disposing of the cesium, strontium, actinides and rare earths.

2. The method of claim 1 wherein the complex organoboron compound is cobalt dicarbollide.

3. The method of claim 2 wherein the cobalt dicarbollide is halogenated.

4. The method of claim 3 wherein said cobalt dicarbollide is chlorinated cobalt dicarbollide.

5. The method of claim 1 wherein the polyethylene glycol is

wherein
   n is 5–14 and;
   R is H, an alkyl group having 1–20 carbon atoms, or a phenyl group substituted with alkyl groups having 1–8 carbon atoms.

6. The method of claim 1 wherein said neutral organophosphorus compound is:

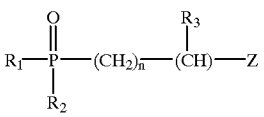

wherein
   n=0 or 1; $R_1$ and $R_2$ are alkyl groups having 4–10 carbon atoms, alkoxy groups having 4–8 carbon atoms, phenyl groups, or substituted phenyl groups where the substituents are alkyl groups having 1–10 carbon atoms;

$R_3$ is H or an alkyl group having 1–5 carbon atoms; and Z is

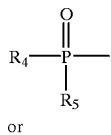

or

wherein,
$R_4$ and $R_5$ are alkyl groups having 4–10 carbon atoms, alkoxy groups having 4–8 carbon atoms, phenyl groups, or substituted phenyl groups where the substituents are alkyl groups having 1–10 carbon atoms, $R_6$ and $R_7$ are alkyl groups having 2–8 carbon atoms, or $R_6$ and $R_7$ form a morpholine, piperidine, or pyrrolydine ring with the nitrogen.

7. The method of claim 6 wherein the neutral organophosphorus compound is diphenyl-dibutyl carbamoylmethylenephosphine oxide.

8. The method of claim 1 wherein the diluent is one or more selected from the group consisting of alkylbenzene, dialkylbenzene, trialkylbenzene, alkylnitrobenzene and polyfluoroalkylnitrobenzenes.

9. The method of claim 1 wherein the diluent is a polyfluorinated compound, polyfluorinated ester or polyfluorinated ether.

10. The method of claim 1 wherein the diluent is a polyfluoro-substituted sulfone with the formula:

wherein;
$R_1$ is a polyfluoroalkyl, where the alkyl group has 1–3 carbon atoms, and 2–7 fluorine atoms, and
$R_2$ is an alkyl group having 4–12 carbon atoms, or an aryl, aralkyl, or alkoxyalkyl group having 6–10 carbon atoms, or
$R_2$ is polyfluoroalkoxyalkyl, where the alkyl group has 6–10 carbon atoms, and 2–7 fluorine atoms.

11. The method of claim 10 wherein the diluent is phenyltrifluoromethyl sulfone.

12. The method of claim 1 wherein the polyethylene glycol is unsubstituted.

13. A method for simultaneously recovering cesium, strontium, rare earths and actinides from liquid radioactive waste comprising:
a) contacting the liquid radioactive waste with a solution of a chlorinated cobalt dicarbollide, polyethylene glycol-400, and diphenyl-dibutyl carbamoylmethylenephosphine oxide in a diluent of phenyltrifluoromethyl sulfone,
b) separating out an organic phase and an aqueous phase,
c) mixing stripping reagents with the organic phase formed in step (b), so that an aqueous phase and an organic phase are formed, wherein the cesium, strontium, actinides and rare earths are extracted into the aqueous phase, and
d) recovering or disposing of the cesium, strontium actinides and rare earths.

14. The method of claim 13 wherein the organic phase formed by the stripping reagents in step (c) is recycled back to the solution of liquid radioactive waste and extracting agents in step (a).

* * * * *